(12) United States Patent
Sheridon et al.

(10) Patent No.: US 6,524,500 B2
(45) Date of Patent: Feb. 25, 2003

(54) METHOD FOR MAKING MICROENCAPSULATED GYRICON BEADS

(75) Inventors: Nicholas K. Sheridon, Los Altos, CA (US); Nassim Khonsari, San Mateo, CA (US); Naveen Chopra, Oakville (CA)

(73) Assignee: Xerox Corporation, Stamford, CT (US)

( * ) Notice: Subject to any disclaimer, the term of this patent is extended or adjusted under 35 U.S.C. 154(b) by 211 days.

(21) Appl. No.: 09/749,379

(22) Filed: Dec. 28, 2000

(65) Prior Publication Data

US 2002/0084539 A1 Jul. 4, 2002

(51) Int. Cl.$^7$ ................................................ B29D 11/00
(52) U.S. Cl. .............................. 264/1.7; 264/4.4; 264/7; 264/8; 425/8
(58) Field of Search ............................ 264/4, 4.4, 7, 8, 264/1.7, 2.1; 425/8, 6

(56) References Cited

U.S. PATENT DOCUMENTS

| | | |
|---|---|---|
| 2,326,634 A | 8/1943 | Gebhard et al. |
| 2,354,018 A | 7/1944 | Heltzer et al. |
| 2,354,048 A | 7/1944 | Palmquist |
| 2,354,049 A | 7/1944 | Palmquist et al. |
| 2,407,680 A | 9/1946 | Palmquist |
| 2,600,963 A | 6/1952 | Bland |
| 2,684,788 A | 7/1954 | Bland |
| 2,794,301 A | 6/1957 | Law et al. |
| 2,950,985 A | 8/1960 | Duval d'Adrian |
| 2,965,921 A | 12/1960 | Bland |
| 2,980,547 A | 4/1961 | Duval D'Adrian |
| 3,150,947 A | 9/1964 | Bland |
| 3,222,204 A | 12/1965 | Weber et al. |
| 3,243,273 A | 3/1966 | Bland |
| 3,310,391 A | 3/1967 | Law |
| 3,617,333 A | 11/1971 | Brown |
| 3,648,281 A | 3/1972 | Dahms et al. |
| 3,795,435 A | 3/1974 | Schwab |
| 3,915,771 A | 10/1975 | Gatzke et al. |
| 4,002,022 A | 1/1977 | Lopez |
| 4,082,426 A | 4/1978 | Brown |
| RE29,742 E | 8/1978 | Tung |
| 4,117,192 A | 9/1978 | Jorgensen |
| 4,117,194 A | 9/1978 | Barbe et al. |
| 4,126,854 A | 11/1978 | Sheridon |
| 4,143,103 A | 3/1979 | Sheridon |
| 4,229,732 A | 10/1980 | Hartstein et al. |
| 4,261,653 A | 4/1981 | Goodrich |
| 4,267,946 A | 5/1981 | Thatcher |

(List continued on next page.)

FOREIGN PATENT DOCUMENTS

| | | |
|---|---|---|
| DE | 40 08825 A1 | 3/1991 |
| FR | 2161301 | 7/1973 |
| JP | SHO 5357998 | 5/1978 |

OTHER PUBLICATIONS

Lawrence L. Lee, "A Magnetic–Particles Display", *IEEE Transactions on Electron Devices*, vol. ED 22, No. 9, Sep. 1975, pp. 758–765.

Richard A. Strain, "Additive Color Mixture with Fluorescent Pigments and Special Illumination", *Color Research and Application*, vol. 1, No. 3, Fall 1976, pp. 146–147.

(List continued on next page.)

*Primary Examiner*—Mathieu D. Vargot
(74) *Attorney, Agent, or Firm*—Oliff & Berridge, PLC

(57) ABSTRACT

A method for making microencapsulated gyricon beads comprising the steps of converging a first, second, third and fourth materials in a liquid state; forming a bead from the first and second materials, the bead having two hemispheric surfaces with one surface differing from the other in optical and electrical characteristics; surrounding the bead with the third material; encapsulating the third material with the fourth material; and solidifying the fourth material.

16 Claims, 4 Drawing Sheets

U.S. PATENT DOCUMENTS

| | | |
|---|---|---|
| 4,268,413 A | 5/1981 | Dabisch |
| 4,288,788 A | 9/1981 | Rogers et al. |
| 4,299,880 A | 11/1981 | Arens |
| 4,367,920 A | 1/1983 | Tung et al. |
| 4,374,889 A | 2/1983 | Arens |
| 4,381,616 A | 5/1983 | Saxer |
| 4,418,098 A | 11/1983 | Maistrovich |
| 4,438,160 A | 3/1984 | Ishikawa et al. |
| 4,441,791 A | 4/1984 | Hornbeck |
| 4,492,435 A | 1/1985 | Banton et al. |
| 4,500,172 A | 2/1985 | Gagnon et al. |
| 4,511,210 A | 4/1985 | Tung et al. |
| 4,569,857 A | 2/1986 | Tung et al. |
| 4,592,628 A | 6/1986 | Altman et al. |
| 4,678,695 A | 7/1987 | Tung et al. |
| 4,688,900 A | 8/1987 | Doane et al. |
| 4,695,528 A | 9/1987 | Dabisch et al. |
| 4,710,732 A | 12/1987 | Hornbeck |
| 4,713,295 A | 12/1987 | Laroche |
| 4,721,649 A | 1/1988 | Belisle et al. |
| 4,725,494 A | 2/1988 | Belisle et al. |
| 4,729,687 A | 3/1988 | Arens |
| 4,810,431 A | 3/1989 | Leidner |
| 4,837,071 A | 6/1989 | Tagoku et al. |
| 4,877,253 A | 10/1989 | Arens |
| 4,890,902 A | 1/1990 | Doane et al. |
| 4,919,521 A | 4/1990 | Tada et al. |
| 4,948,232 A | 8/1990 | Lange |
| 4,956,619 A | 9/1990 | Hornbeck |
| 4,991,941 A | 2/1991 | Kalmanash |
| 4,994,204 A | 2/1991 | Doane et al. |
| 5,039,557 A | 8/1991 | White |
| 5,075,186 A | 12/1991 | Sheridon |
| 5,128,203 A | 7/1992 | LaRoche |
| 5,155,607 A | 10/1992 | Inoue et al. |
| 5,157,011 A | 10/1992 | Okabe et al. |
| 5,189,658 A | 2/1993 | Moses |
| 5,219,820 A | 6/1993 | Morohoshi et al. |
| 5,226,099 A | 7/1993 | Mignardi |
| 5,249,000 A | 9/1993 | Okabe et al. |
| 5,251,048 A | 10/1993 | Doane et al. |
| 5,262,098 A | 11/1993 | Crowley et al. |
| 5,262,374 A | 11/1993 | Okabe et al. |
| 5,274,460 A | 12/1993 | Yamada et al. |
| 5,315,418 A | 5/1994 | Sprague et al. |
| 5,315,776 A | 5/1994 | Strawbridge et al. |
| 5,331,454 A | 7/1994 | Hornbeck |
| 5,344,594 A | 9/1994 | Sheridon |
| 5,354,598 A | 10/1994 | Arens |
| 5,363,222 A | 11/1994 | Ledebuhr |
| 5,383,008 A | 1/1995 | Sheridon |
| 5,384,067 A | 1/1995 | Doane et al. |
| 5,389,426 A | 2/1995 | Arens et al. |
| 5,389,945 A | 2/1995 | Sheridon |
| 5,397,503 A | 3/1995 | Yuasa et al. |
| 5,416,996 A | 5/1995 | Clemens et al. |
| 5,432,526 A | 7/1995 | Hyatt |
| 5,432,534 A | 7/1995 | Maruyama et al. |
| 5,459,602 A | 10/1995 | Sampsell |
| 5,469,020 A | 11/1995 | Herrick |
| 5,515,075 A | 5/1996 | Nakagiri et al. |
| 5,526,016 A | 6/1996 | Nakagiri et al. |
| 5,535,047 A | 7/1996 | Hornbeck |
| 5,604,027 A | 2/1997 | Sheridan |
| 5,767,826 A | 6/1998 | Sheridan et al. |
| 5,891,479 A | * 4/1999 | Sheridon .................. 425/8 |

OTHER PUBLICATIONS

M. Saitoh, T, Mori, R. Ishikawa and H. Tamura, "A Newly Developed Electrical Twisting Ball Display", *Proceeding of the SID*, vol. 23, No. 4, 1982, pp. 249–253.

R. Micheletto, H. Fukada and M. Ohtsu, "A Simple Method for the Production of a Two–Dimensional, Ordered Array of Small Latex Particles", *Langmuir*, vol. 11, No. 9, May 1995, pp. 3333–3336.

Deane B. Judd and Gunter Wyszecki, *Color in Business, Science and Industry* ($2^{nd}$ Ed.), New York: John Wiley and Sons, Inc., 1967, pp. 387–405.

Wesely Wm. Wendlandt and Harry G. Hecht, *Reflectance Spectroscopy*, New York: Interscience Publishers, 1966, pp. 46–91, and 253–275.

G. Chui, "A Page from the Future", San Jose Mercury News, Jun. 18, 1996, pp. 11E, 12E.

J.L. Bruneel and F. Micherson, "Optical Display Device Using Bistable Electrets", *Applied Physics Letters*, vol. 30, No. 8, Apr. 15, 1977, pp. 382–383.

Robert L. Saxe and Robert I. Thompson, "Suspended–Particle Devices", *Information Display*, nos. 4&5, 1996, pp. 20–23.

Lars A. Yoder, "The TI Digital Light Processing Micromirror Tech: Putting It To Work Now", *Advanced Imaging*, Jun. 1996, pp. 43–46.

"S.I.P. and ETIP to jointly develop the world's first erasable and reusable paper for printing," *Business Wire* (available through Dialog. File 610), Aug. 19, 1991.

"Electric Paper: A Research Odyssey" *IEEE Grid*, Jan. 1996, pp. 17–20.

"Thermal Film Medium for Ricoh Permits Rewriting", *OEP* (*Office Equipment and Products*), Dec. 1993, p. 61.

Peter Tebbutt, "Now you see it . . . now you don't", *New Scientist*, May 30, 1992, p. 17.

J.D. Mosley, "Flexible LCD is lighter and thinner than glass", *EDN*, Oct. 31, 1985, p. 93.

A. Chiang, D. Curry and M. Zarzychi, "A Stylus Writable Electrophoretic Display Device", *SID 79 Digest*, 1979 pp. 44–45.

N.K. Sheridon and M.A. Berkovitz, "The Gyricon—A Twisting Ball Display", *Proceedings of the SID*, vol. 18/3 & 4, 1977, pp. 289–293.

R. Yamaguchi and S. Sato, "Light Scattering and Reflection Properties in Polymer Dispersed Liquid Crystal Cells with Memory Effects", *IEICE Trans. Electron.*, vol. E 78 C No. 1, Jan. 1995, pp. 106–110.

G. Crawford, "A Bright New Page in Portable Displays", IEEE Spectrum, Oct. 2000, pp. 40–46.

P. Yam, "Plastics Get Wired", Scientific American, Jul. 1995, pp. 82–87.

W. Gibbs, "The Reinvention of Paper", Scientific American, Sep. 1998, pp. 36–40.

* cited by examiner

METHOD FOR MAKING MICROENCAPSULATED GYRICON BEADS

BACKGROUND OF THE INVENTION

1. Field of Invention

This invention relates generally to visual displays and to gyricon or twisting-element displays.

2. Description of Related Art

Gyricon, or twisting, particles, such as balls and cylinders, are used to make gyricon displays. A gyricon display is also referred to as electric paper. A gyricon display comprises twisting particles that individually rotate to display a desired surface or a desired aspect of transparency of the particles to an observer.

Twisting particles can be, for example, a ball having two distinct hemispheres with both an optical anisotropy and an electrical anisotropy due to each hemisphere surface having a different color and electrical charge. The twisting particles are generally embedded in a fluid-filled cavity of a substrate. The substrate is then generally bonded between glass or plastic sheets to create a gyricon display. When an electric field is presented over the display, the twisting particles within the substrate rotate in reaction to the electric field by rotating in the fluid. U.S. Pat. Nos. 4,126,854 to Sheridon and 4,143,103 to Sheridon each incorporated herein by reference in its entirety, describe conventional twisting ball displays each.

Gyricon displays ideally have characteristics and qualities of conventional paper, such as flexibility. However, conventional gyricon displays are not paper-like because they are generally too rigid. A further discussion of the disadvantages of conventional gyricon displays is found in U.S. Pat. No. 5,064,027 to Sheridon, which is incorporated herein by reference in its entirety.

In an effort to make the gyricon displays more paper-like, attempts have been made to individually encapsulate the twisting particles. This is called microencapsulation. Microencapsulated twisting particles are then incorporated into a flexible substrate without needing a protective sheet of glass or plastic.

A conventional approach to microencapsulating a twisting particle centers on a chemical process where the twisting particles are first produced using conventional methods and then are subsequently immersed and treated in chemical solutions, resulting in a capsule, as disclosed in the '027 patent.

SUMMARY OF THE INVENTION

Chemical methods of microencapsulating gyricon beads require numerous additional steps in making a display and thus add substantially to the cost of making the display. Further, there is a limited yield in the chemical methods and errors occur that are difficult to eliminate. Among the errors it is found that some microcapsules do not contain balls and others contain two or more balls. Capsules that do not contain balls subtract from the contrast of the display and capsules that contain two or more balls do not exhibit good ball rotation because of interference between the balls, again causing a loss in contrast. Still further, the chemical processes used in producing the microencapsulation of the balls have been found to be incompatible with the chemistry of the balls, on occasion, limiting the types of balls that can be microencapsulated.

This invention provides methods of both fabricating gyricon beads and in the same instant process, microencapsulating each said ball singly in a liquid-filled capsule.

This invention separately provides methods of microencapsulating a twisting particle. This invention separately provides methods for microencapsulating a twisting particle, that do not use chemical processes.

This invention separately provides methods for making a micro-capsule containing a bichromal bead and a liquid that engulfs the bichromal bead.

This invention separately provides a method for making a microencapsulated gyricon bead based on the differences of the surface tensions of the respective materials that form various layers and/or portions of the microencapsulated gyricon bead.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Figure 1:
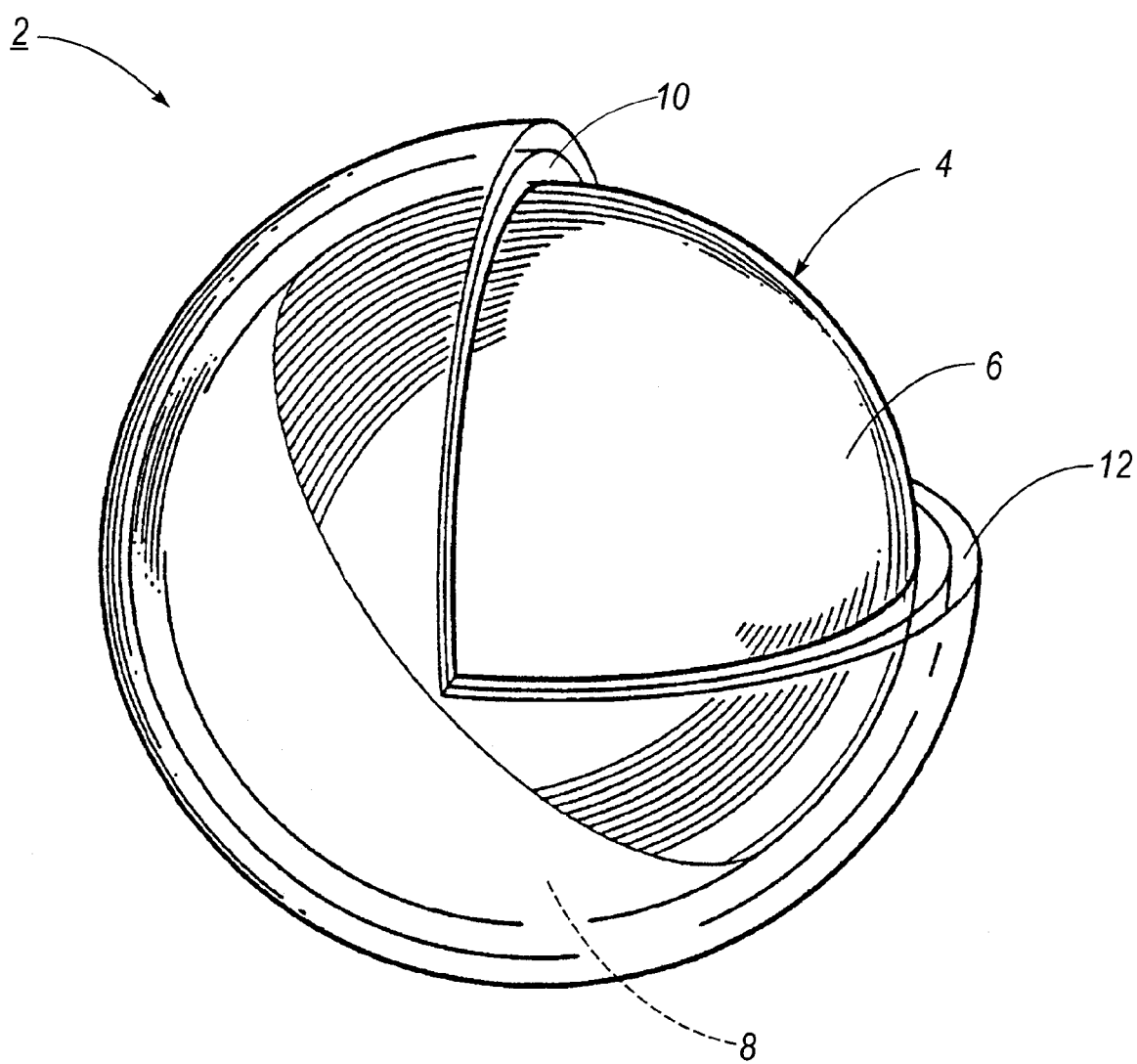
FIG. 1 is a partially cut-away perspective view of one exemplary embodiment of a microencapsulated gyricon bead formed according to this invention.

FIG. 1 illustrates a microencapsulated gyricon bead 2. The microencapsulated gyricon bead 2 includes a bichromal bead 4 formed of a first material 6 and a second material 8. The microencapsulated gyricon bead 2 also includes a liquid third material 10 that surrounds the bead 4. The bead 4 and the third material 10 are disposed within a solid fourth material 12.

The first material 6 and the second material 8 divide the gyricon bead 4 into two hemispheres. The hemispheres of the bead 4, namely the first material 6 and the second material 8, are both optically isotropic and electrically isotropic.

In various exemplary embodiments, the first material 6 and the second material 8 are pigmented plastics. In various exemplary embodiments, the first material 6 and the second material 8 have different surface colors. In various exemplary embodiments, for example the first material 6 is black pigmented plastic, while the second material 8 is white pigmented plastic. Liquid third material 10 is a rotation medium, such as a transparent oil. The bead 4 is encapsulated by and rotates within liquid third material 10. In various exemplary embodiments, the fourth material 12 is a transparent material. In various exemplary embodiments, the fourth material 12 is a plastic. The fourth material 12 acts as an outer skin for the microencapsulated gyricon bead 2.

Figure 2:
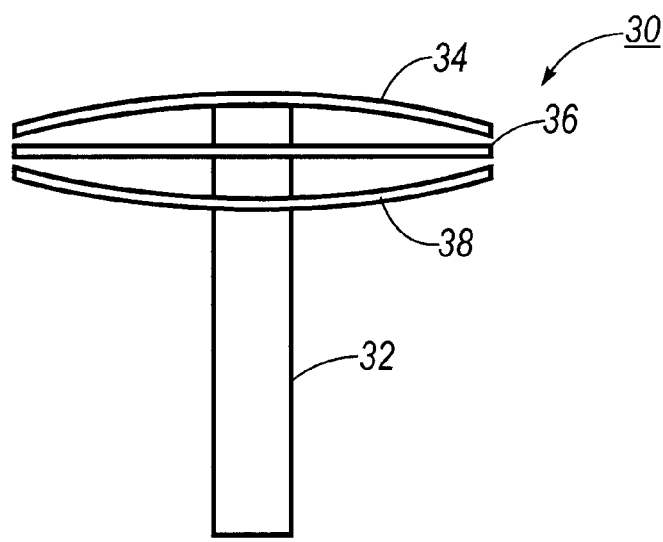
FIG. 2 illustrates a multiple disk assembly usable to fabricate microencapsulated gyricon twisting particles according to this invention.

FIG. 2 illustrates a multiple spinner disk bead generator 30. U.S. Pat. No. 5,767,826 to Sheridon, describes how multiple spinner disks are used to construct gyicon beads. As shown in FIG. 2, in one exemplary embodiment, the disk bead generator 30 includes a drive shaft 32, a top disk 34, a middle disk 36 and a bottom disk 38. The top disk 34, the middle disk 36 and the bottom disk 38 are mounted on the drive shaft 32. Each of the top, middle and bottom disks 34, 36, and 38 have a top and bottom surface.

Figure 3:
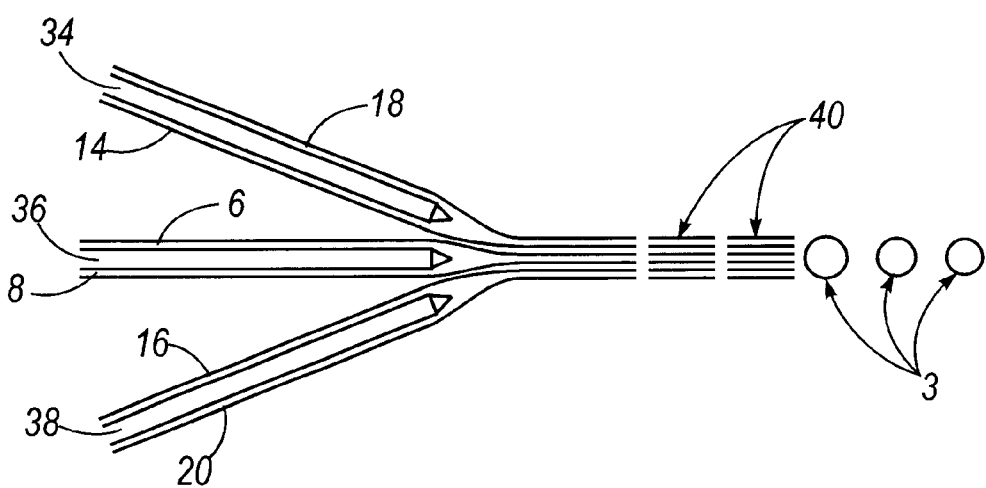
FIG. 3 illustrates a enlarged partial side view of the multiple disk assembly of FIG. 2 in operation with an exemplary embodiment of the converged streams of material shortly after exiting the disk assembly according to this invention.

To create the micorencapsulated gyricon bead 2, the first material 6, the second material 8, the third material 10 and the fourth material 12 are introduced to the disk bead generator 30. In various exemplary embodiments, the first material 6 is introduced to the top surface of the middle disk 36. The first material 6 is in a molten liquid state when introduced to the middle disk 36, as shown in FIG. 3. The second material 8 is introduced to the bottom surface of the middle disk 36. The second material 8 is also in a molten liquid state when introduced to the middle disk 36.

The third material 10 is introduced to the top disk 34 and the bottom disk 38. The third material 10 includes a first layer 14 and a second layer 16. The first layer 14 is introduced on the interior or bottom surface of the top disk 34, as shown in FIG. 3. The second layer 16 is introduced on the interior or top surface of the bottom disk 38, as shown in FIG. 3.

The fourth material 12 is introduced in a molten state to the top disk 34 and the bottom disk 38. The fourth material includes a first layer 18 and a second layer 20. The first layer 18 is introduced to the outer or top surface of the top disk 34, as shown in FIG. 3. The second layer is introduced to the outer or bottom surface of the bottom disk 38, as shown in FIG. 3.

As the materials 6, 8, 10 and 12 are introduced to the bead generator 30, the disks 34, 36 and 38 are rotated. The rotation of the disks 34, 36 and 38 causes the materials 6, 8, 10 and 12, all in a liquid state, to exit the disks 34, 36 and 38, as generally illustrated in FIG. 3. The six streams of liquids, namely the first layer 18 of the fourth material 12, the first layer 14 of the third material 10, the first material 6, the second material 8, the second layer 16 of the third material 10 and the second layer 20 of the fourth material 12, exit the disks 34, 36, and 38 and converge. The converged streams form ligaments 40 that break apart and form drops 3 that gradually coalesce into the microencapsulated gyricon beads 2, as described further below. The details regarding using the multiple disk bead generator 30 are disclosed in the incorporated '826 patent.

Figure 4:
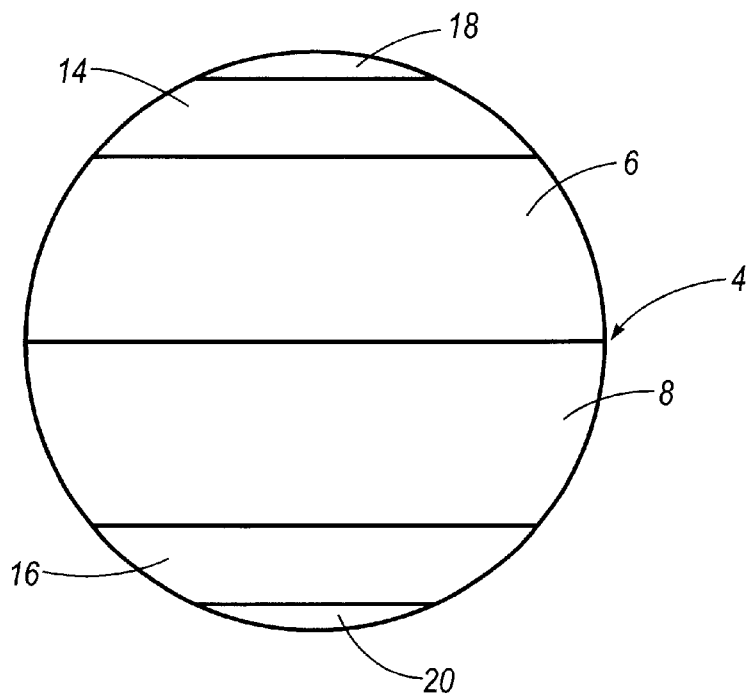
FIG. 4 is a side view of one exemplary embodiment of a microencapsulated gyricon bead at a first instant during one exemplary embodiment of the bead formation and encapsulation process according to this invention.
Figure 5:
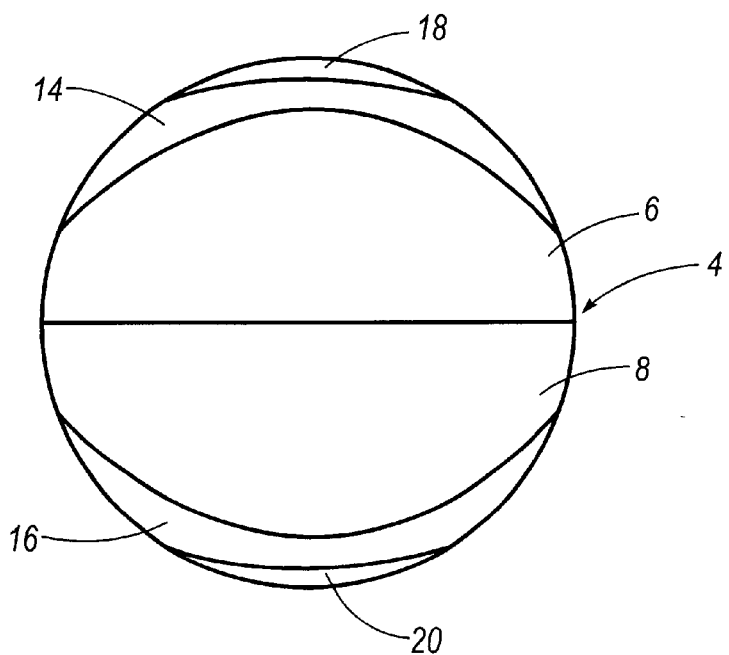
FIG. 5 is a side view of one exemplary embodiment of the microencapsulated gyrion bead at a second later instant during one exemplary embodiment of the bead formation and encapsulation according to this invention.
Figure 6:
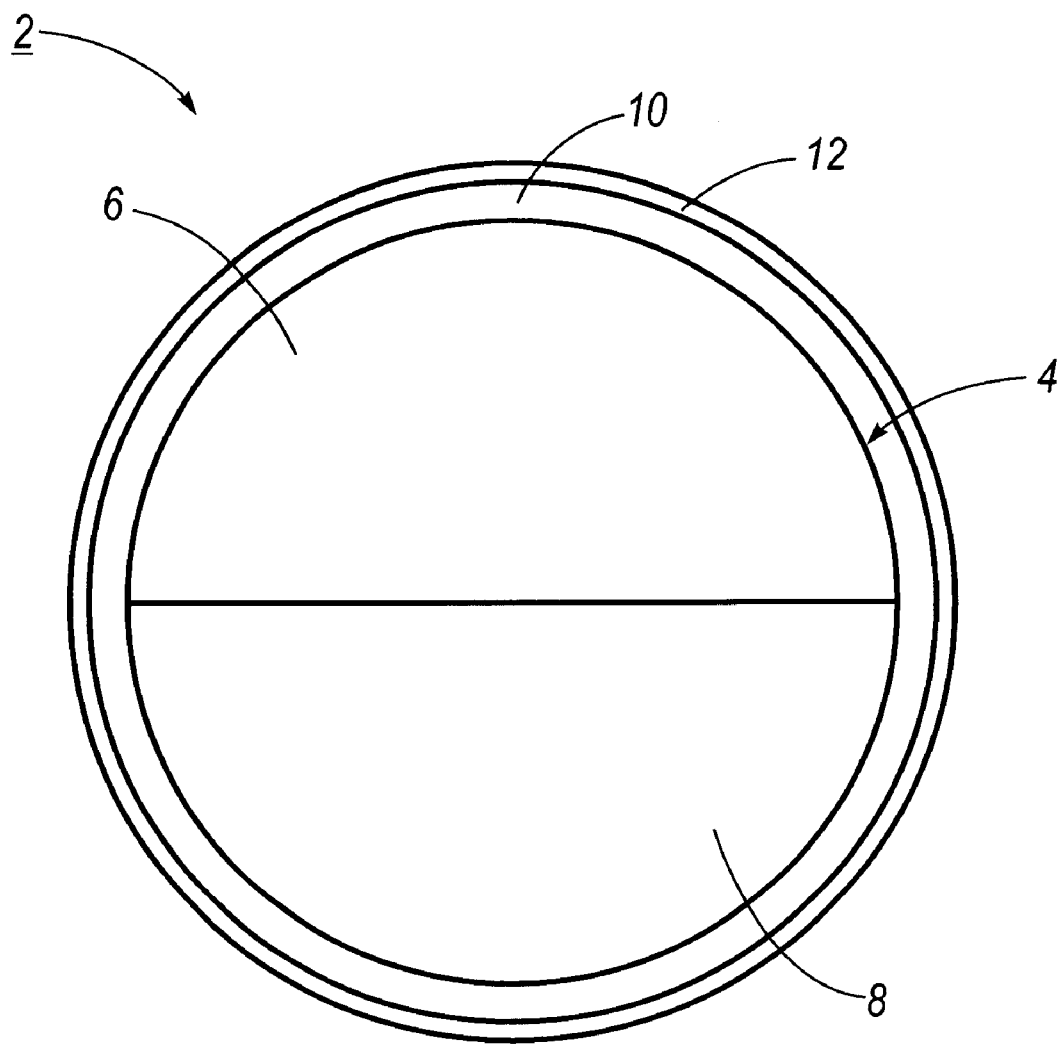
FIG. 6 is a cross sectional view of one exemplary embodiment of the microencapsulated gyricon bead at a third, latest instant during one exemplary embodiment of the bead formation and encapsulating process according to this invention.

FIGS. 4 through 6 illustrate the formation of the microencapsulated gyricon bead 2 device 2, through various continuous stages. FIG. 4 illustrates the converged materials in an initial state, not long after the streams of the materials 6, 8, 10 and 12 have broken apart to form the ligaments 40 and the drops 3. The first material 6 and the second material 8 will form the gyricon bead 4. Disposed adjacent to the first material 6 is the first layer 14 of the third material 10. The second layer 16 of the third material 10 is disposed adjacent the second material 8. The first and second layers 14 and 16 of the third material 10 will coallesce into a single layer that surrounds and engulfs the gyricon bead 4, as discussed further below.

The first layer 18 of the fourth material 12 is disposed adjacent the first layer 14 of the third material 10. The second layer 20 of the fourth material 12 is disposed adjacent the second layer 16 of the third material 10. The first and second layers 18 and 20 of the fourth material will coallesce into a single layer that surrounds and engulfs, and solidifies around, the third material 10.

FIG. 4 illustrates the state of the microencapsulated gyricon bead 2 at a first instant during one exemplary embodiment of the bead formation and encapsulation process according to this invention. The microencapsulated gyricon bead 2 forms from the drop 3 because of the differences in surface tensions of the materials 6, 8, 10 and 12 disposed adjacent to one another. A first liquid will tend to engulf a neighboring second liquid if the first liquid has a lower surface tension than the second liquid. In various exemplary embodiments, the surface tension of the first material 6 is about equal to the surface tension of the second material 8. In these exemplary embodiments, the surface tensions of the first and second materials 6 and 8 should be within about 5 dyne cm of each other.

In various exemplary embodiments, the surface tensions of the first material 6 and the second material 8 are greater than the surface tension of the first layer 14 and the second layer 16 of the third material 10. In these exemplary embodiments, the surface tensions of the first and second materials 6 and 8 should be about 1 dyne cm or more greater than the surface tension of the third material 10.

As shown in FIG. 5, with the first material 6 and the second material 8 having surface tensions that are higher than the surface tension of the third material, the microencapsulated gyricon bead 2 will begin to form from the bead drop 4 and the layers 14 and 16 of the third material 10 will begin to expand across the surface of the first and second materials 6 and 8. At the same time, the first and second materials will begin to take on hemispherical shapes as they form the bead 4.

The melting temperatures of the first and second materials 6 and 8 are less than the melting temperature of the third material 10, since the material 10 is a dielectric liquid that is intended to remain liquid in order for the gyricon to operate. The melting temperature of the fourth material 12 will also be greater than that of the material 10 for the same reasons. It is important to understand, that as the microencapsulated gyricon bead 2 moves through the air cooling is accomplished by heat exchange with the air. Thus, the fourth material skin 12 will cool first and the bichromal ball hemispheres first and second materials 6 and 8 will cool last. Best bichromal ball quality is obtained when the bichromal ball solidifies quickly. Therefore, it will likely be useful to operate with the temperatures close to the solidifying temperatures for first and second materials 6 and 8. On the other hand, it is important that the fourth material 12 remain liquid until it has fully covered the outside of the bead 4, hence this material will be introduced at relatively high temperature.

FIG. 5 illustrates an intermediate shape that the microencapsulated device 2 passes through as it responds to the differences in the surface tensions of the various materials. FIG. 5 also illustrates the layers 14 and 16 of the third material or rotation medium 10 nearing convergence for surrounding the bead 4.

The first and second layers 18 and 20 of the fourth material 12 will coalesce and encapsulate the third material 10 to form the outer skin of the microencapsulated gyricon bead 2.

While the microencapsulated gyricon bead 2 is forming, the surface tension of the fourth material 12 is less than the surface tension of the third material 10. Having a lower surface tension than the third material 10, will encourage the fourth material 12 to engulf the third material 10. This happens as the system tends to minimize its free energy. In various exemplary embodiments, the surface tension of the fourth material 12 is at least about 1 dyne cm less than the surface tension of the third material 10.

As the materials travel through the ambient air after exiting the generator 30, the bead 4, is eventually surrounded by the third material 10 and the fourth material eventually encapsulates the third material 10.

The relative speeds with which these events are accomplished are determined by the viscosities of these materials and thickness of their layers. The third material 10 will typically have a viscosity of about 2 centistokes and a thickness that is about equal to 5 to 20% of the diameter of the bead 4. This will typically be a greater thickness than that of the fourth material 12. The fourth material 12 will typically have a much greater viscosity than the third material 10. Hence, it can be expected that the third material 10 will fully surround the bead 4 before the fourth material 12 can. It is important that things happen in this sequence, since otherwise the fourth material 12 might solidify against the bead 4 surface and prevent the formation of a complete spherical oil-filled cavity.

As described in co-pending patent application Ser. No. 09/427,656, filed on Oct. 26, 1999, which is incorporated herein by reference, the bichromal balls may be made from a variety of plastic and wax materials, such as nylon and Camauba was. In various exemplary embodiments, the material is Ploywax 1000 manufactured by the Baker-Petrolite Corporation. This material is a nearly crystalline polymer that retains a low melt viscosity until just above the melting temperature, a condition that is important for the quality of the bichromal ball formation. In various exemplary embodiments, the material used for the white hemisphere of the ball is typically Polywax 1000 into which titanium dioxide pigment is dispersed for whiteness. In various exemplary embodiments, on the black hemisphere of the ball a variety of black pigments may be used, such as carbon black. In various exemplary embodiments, the pigment for the black hemisphere is Ferro 6331, manufactured by the Ferro Corporation.

The material of the third material 10 may be any dielectric liquid, such as the Isopars by the Exxon Corporation, but the preferred liquid is 1 or 2 centistoke silicone 200 liquid by the Dow Coming Corporation.

The material of the fourth material/skin 12 may be any highly transparent and physically tough polymer with a temperature/viscosity profile that will allow it to engulf the bead 4 sufficiently quickly to enable microencapsulated bead formation. The preferred material is Polywax 1000 and Polywax 2000.

FIG. 6 is a cross sectional view of one exemplary embodiment of the microencapsulated gyricon bead 2 at a third, latest instant during one exemplary embodiment of the bead formation and encapsulating process. For clarity, the cross sectional lines are omitted from FIG. 6. The fourth material 12, is then solidified to form the skin of the microencapsulated gyricon bead 2 as shown in FIG. 1.

In various exemplary embodiments, solidifying the fourth material 12 is accomplished by cooling. The cooling is a result of the microencapsulated gyricon bead 2 traveling through the ambient air during the bead formation process. In various exemplary embodiments, the ambient air is cooler than the temperatures of the fourth material 12 after exiting the bead generator 30. In various exemplary embodiments, the rate of solidifying the fourth material 12 may be increased or decreased by controlling the temperature of the ambient air.

In the exemplary embodiments, because the third material 10 has a surface tension that is different than that of the first and second materials 6 and 8, an instability is created. This instability causes the first material 6 and the second material 8 to form the bichromal bead 4 essentially independent of the rest of the other materials. The cooling rate of the microencapsulated gyricon bead 2 as it moves through the air may be slowed to help the forming of the microencapsulated gyricon bead 2. In various exemplary embodiments, this is accomplished by either starting with higher initial liquid temperatures or by heating the ambient air.

In various exemplary embodiments, because the fourth material 12 has a lower surface tension than the third material 10, instability between the respective materials is created. This instability resolves itself by causing the fourth material 12 to flow over and engulf the third material 10.

It should be appreciated that the formation of microencapsulated gyrican bead 2 is based upon the instabilities of the converging liquids to ensure that the appropriate layers engulf the layers that are desired to be engulfed.

In various exemplary embodiments, the bichromal ball diameters range between 20 microns and 150 microns. The third material 10 thickness when the microencapsulated gyricon bead 2 is formed will lie between 3% and 20% of the bichromal bead 4 diameter with 5% being preferred. The thickness of the fourth material/skin 12 when the microencapsulated gyricon bead 2 is formed will lie between about 0.1% and about 10% of the bichromal bead 4 diameter, with 1% being preferred.

While this invention has been described in conjunction with the exemplary embodiments outlined above, it is evident that many alternatives, modifications and variations will be apparent to those skilled in the art. Accordingly, the exemplary embodiments of this invention as set forth above, are intended to be illustrative, not limiting. Various changes may be made without departing from the spirit and scope of the invention.

What is claimed is:

1. A method for making a microencapsulated gyricon bead comprising:

converging first, second, third and fourth materials in a liquid state;

forming a bead from the coalescing of the first and second materials, which have substantially the same surface tension, the formed bead having two hemispherical surfaces with one surface differing from the other in optical and electrical characteristics;

surrounding the bead with the third material by the coalescing of the third material around the bead, the third material having a surface tension less than the first material and the second material and having a melting temperature greater than the first material and the second material;

encapsulating the third material with the fourth material by coalescing of the fourth material around the third material, the fourth material having a surface tension less than the surface tension of the third material; and, solidifying the fourth material.

2. The method of claim 1, wherein converging the first, second, third and fourth materials comprises introducing the first, second, third and fourth materials to disks of a multiple disk bead generator; and rotating the disks wherein the first, second, third and fourth materials exit disks and converge.

3. The method of claim 1, wherein the first material has a melting temperature that is less than a melting temperature of the fourth material.

4. The method of claim 1, wherein, during encapsulating the third material, the third material has a viscosity that is greater than a viscosity of the fourth material.

5. The method of claim 1, wherein, during converging of the first, second, third and fourth materials, a temperature of the third material is less than a temperature of the fourth material.

6. The method of claim 1, wherein, during converging of the first, second, third and fourth materials, a temperature of the first material is less than a temperature of the third material.

7. The method of claim 1, wherein, during converging of the first, second, third and fourth materials, a temperature of the second material is less than a temperature of the third material.

8. The method of claim 1, wherein solidifying the fourth material comprises cooling the fourth material using ambient air.

9. The method of claim 1, wherein converging the first, second, third and fourth materials comprises converging at least a first layer of each of the first and second materials and at least two layers of each of the third and fourth materials.

10. The method of claim 9, wherein:
a first one of the at least two layers of the third material is adjacent to one of the first and second materials; and,
a second one of the at least two layers of the third material is adjacent to the other of the first and second materials.

11. The method of claim 10, wherein, surrounding the bead comprises flowing at least the first and second layers of the third material around both of the first and second materials.

12. The method of claim 9, wherein:
a first one of the at least two layers of the fourth material is adjacent to a first one of the at least two layers of the third material; and,
a second one of the at least two layers of the fourth material is adjacent to a second one of the at least two layers of the third material.

13. The method of claim 12, wherein encapsulating the third material comprises flowing at least the first and second layers of the fourth material around the third material.

14. A method for making a microencapsulated gyricon bead, comprising:
introducing a first, second, third and fourth materials in a liquid state on separate surfaces of a multi-disc spinner; and, rotating the multi-disc spinner to eject and converge the first, second, third and fourth materials from the multi-disc spinner, wherein:
the first material and the second material have substantially the same surface tension so as to coalesce to form a bead having two hemispheric surfaces with one surface differing from the other in an optical characteristic and a second characteristic;
the third material has a surface tension less than the first material and the second material so that it surrounds the bead; and
the fourth material encapsulates the third material to form the microencapsulated gyricon bead by coalescing of the fourth material around the third material, the fourth material having a surface tension less than the surface tension of the third material.

15. A method for manufacturing an encapsulated bead, comprising:
converging a first, second, third and fourth materials in a liquid state; and
cooling the first, second, third and fourth materials, wherein:
the first and second materials are converged adjacent one another,
the third material includes a first layer and a second layer with the first layer converged adjacent the first material and the second layer converged adjacent the second material;
the fourth material includes a first layer and a second layer with the first layer converged adjacent the first layer of the third material and the second layer converged adjacent the second layer of the third material;
the first, second, third and fourth materials each have a surface tension while in a liquid state;
the surface tension of the third material is less than the surface tension of the first material and the surface tension of the second material and the surface tension of the first material and the second material are substantially equal so that the first and second materials coalesce to form a bead and the third material coalesces to surround the bead, which is formed to have two hemispheric surfaces with one surface differing from the other in an optical characteristic and a second characteristic;
the surface tension of the fourth material is less than the surface tension of the third material so that the fourth material engulfs the third material; and
the first, second and third materials solidify during the cooling step to form the encapsulated bead.

16. The method as recited in claim 15, wherein the second characteristic is an electrical characteristic.

* * * * *